US011147007B2

(12) United States Patent
Lotter

(10) Patent No.: US 11,147,007 B2
(45) Date of Patent: Oct. 12, 2021

(54) CELL BARRING IN RELAY NODES

(71) Applicant: Nextivity, Inc., San Diego, CA (US)

(72) Inventor: Michiel Petrus Lotter, San Diego, CA (US)

(73) Assignee: NEXTIVITY, INC., San Diego, CA (US)

( * ) Notice: Subject to any disclaimer, the term of this patent is extended or adjusted under 35 U.S.C. 154(b) by 0 days.

(21) Appl. No.: 16/507,806

(22) Filed: Jul. 10, 2019

(65) Prior Publication Data

US 2020/0022064 A1    Jan. 16, 2020

Related U.S. Application Data

(60) Provisional application No. 62/696,277, filed on Jul. 10, 2018.

(51) Int. Cl.
| | | |
|---|---|---|
| *H04W 48/16* | (2009.01) | |
| *H04W 48/04* | (2009.01) | |
| *H04W 8/20* | (2009.01) | |
| *H04W 84/04* | (2009.01) | |

(52) U.S. Cl.
CPC ............. *H04W 48/04* (2013.01); *H04W 8/20* (2013.01); *H04W 48/16* (2013.01); *H04W 84/045* (2013.01)

(58) Field of Classification Search
CPC ..... H04W 48/08; H04W 48/16; H04W 48/04; H04W 8/20; H04W 76/25; H04L 1/1614; H04L 63/0861
See application file for complete search history.

(56) References Cited

U.S. PATENT DOCUMENTS

| | | | |
|---|---|---|---|
| 2013/0022083 A1* | 1/2013 | Vasseur ............... | H04L 12/4035 375/132 |
| 2013/0051366 A1 | 2/2013 | Amerga et al. | |
| 2014/0373124 A1* | 12/2014 | Rubin ................... | H04W 72/10 726/7 |
| 2016/0044727 A1 | 2/2016 | Zisimopoulos et al. | |
| 2017/0006447 A1 | 1/2017 | Bahta et al. | |
| 2018/0220356 A1 | 8/2018 | Tenny et al. | |
| 2019/0357119 A1* | 11/2019 | Hong .................... | H04W 48/08 |

FOREIGN PATENT DOCUMENTS

WO    2013136657    9/2013

OTHER PUBLICATIONS

"International Search Report and Written Opinion" for PCT/US2019/041132, dated Oct. 8, 2019, 7 pages.

* cited by examiner

*Primary Examiner* — Wei Zhao
(74) *Attorney, Agent, or Firm* — Kilpatrick Townsend & Stockton LLP

(57) ABSTRACT

In an aspect, a subscriber identity module (SIM) card can be designated with an access class designation indicating that a first user equipment is barred from camping on or reselecting to a small cell. The small cell can be configured to transmit information to at least one second user equipment in communication with the small cell that the first user equipment incorporating the SIM card with the access class designation is barred from camping on or reselecting to the small cell. The configured small cell can transmit the information to the at least one second user equipment.

18 Claims, 3 Drawing Sheets

CELL BARRING IN RELAY NODES

CROSS-REFERENCE TO RELATED APPLICATIONS

This application claims the benefit under 35 U.S.C. § 119 of U.S. Provisional Application No. 62/696,277, filed on Jul. 10, 2018 and entitled "CELL BARRING IN RELAY NODES," the entirety of which is hereby expressly incorporated by reference herein.

TECHNICAL FIELD

The subject matter described herein relates to wireless repeaters of small cells, and more particularly to cell barring in relay nodes.

BACKGROUND

Relay nodes can include a small cell or femtocell coupled with a long term evolution (LTE) modem to provide backhaul connectivity. In some cases, the small cell can operate on one frequency and the backhaul link can operate on a different frequency. This can resolve any interference problems that may arise with operating the small cell and the backhaul link on a single frequency. In some cases though, single frequency behavior can be desired or required. When single frequency behavior is desired or required, it can be possible for the modem that is to provide the backhaul capability to camp onto the signal from the small cell or femtocell creating a non-functional loop.

Several techniques can improve this situation. One example may be to use a directional antenna to point away from the small cell and towards the macro base station. Another option may be to use signal cancellation techniques to reduce the signal coming from the small cell. These techniques, as well as several others, may help to improve the situation. However, even with the level of the small cell signal significantly reduced at the input to the LTE modem, it may still be possible for the LTE modem to camp onto the signal from the small cell.

One method around this would be to modify the software inside the LTE modem to recognize that a signal may be coming from a small cell and to prevent the modem from camping on the small cell. Such an approach may not be desirable as it makes essentially a standards non-compliant device.

SUMMARY

This disclosure provides a standards-compliant means to achieve the same feature of not camping on a specific small cell. In some cases, the process can operate by establishing a special Access class set for all LTE modems (e.g., first user equipment and/or the like) that are used to provide backhaul for small cells. Such an Access class designation can be stored in the SIM card (e.g., universal integrated circuit card (UICC) and/or the like) that is used by the LTE modem to connect to the network. Small cells, femto cells, and/or the like can be configured to transmit information to all handsets, and/or the like that UE's with the Access class reserved for the LTE modems are barred from camping on or reselecting to the small cell.

In an aspect, a subscriber identity module (SIM) card can be designated with an access class designation indicating that a first user equipment is barred from camping on or reselecting to a small cell. The small cell can be configured to transmit information to at least one second user equipment in communication with the small cell that the first user equipment incorporating the SIM card with the access class designation is barred from camping on or reselecting to the small cell. The configured small cell can transmit the information to the at least one second user equipment.

One or more of the following features can be included in any feasible combination. The first user equipment incorporating the SIM card with the access class designation can be configured to provide backhaul to a wireless network for the small cell. The first user equipment can be barred from camping on or reselecting to the small cell. A first frequency of a first communications channel can be compared with a third frequency of a third communications channel. The first user equipment can be barred from camping on or reselecting to the small cell in response to the first frequency matching the third frequency. The access class designation can be persisted in the SIM card. The first communications channel can be established on a first hop between the first user equipment and a base station of the wireless network. The third communications channel can be established on a third hop between the small cell and the at least one second user equipment. The SIM card can include a universal integrated circuit card. The universal integrated circuit card can retain the persisted access class designation after power to the first user equipment is disconnected.

The designating can include specifying, by the small cell and in response to determining that the first user equipment is barred from camping on or reselecting to the small cell, the access class designation with a first value of a Boolean flag. The Boolean flag can include the first value and a second value different from the first value. The first value can indicate that the first user equipment is barred from camping on or reselecting to the small cell. The second value can indicate that the first user equipment is not barred from camping on or reselecting to the small cell. A backhaul to the wireless network for the small cell can include the first communications channel. The backhaul to the wireless network for the small cell can further include a second communications channel established on a second hop between the first user equipment and the small cell. The second communications channel can operate over a connection between the first user equipment and the small cell.

The first frequency can be compared with the third frequency. The first user equipment can be barred from camping on or reselecting to the small cell in response to the first frequency matching the third frequency. The configuring can further include establishing, by the small cell, the third communications channel. A message including the access class designation indicating that the first user equipment is barred from camping on or reselecting to the small cell can be prepared. The transmitting can further include transmitting, by the small cell and over the third communications channel, a signal including the message. The access class designation can include a cell status code indicating that the first user equipment is prevented from establishing a wireless connection with the small cell. Barring camping on or reselecting to the small cell can include preventing the first user equipment from establishing the wireless connection with the small cell. The small cell can include a cellular radio access node with transmitting power less than a transmitting power of a macrocell. The small cell can further include at least one of a femtocell, a picocell, and a microcell.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
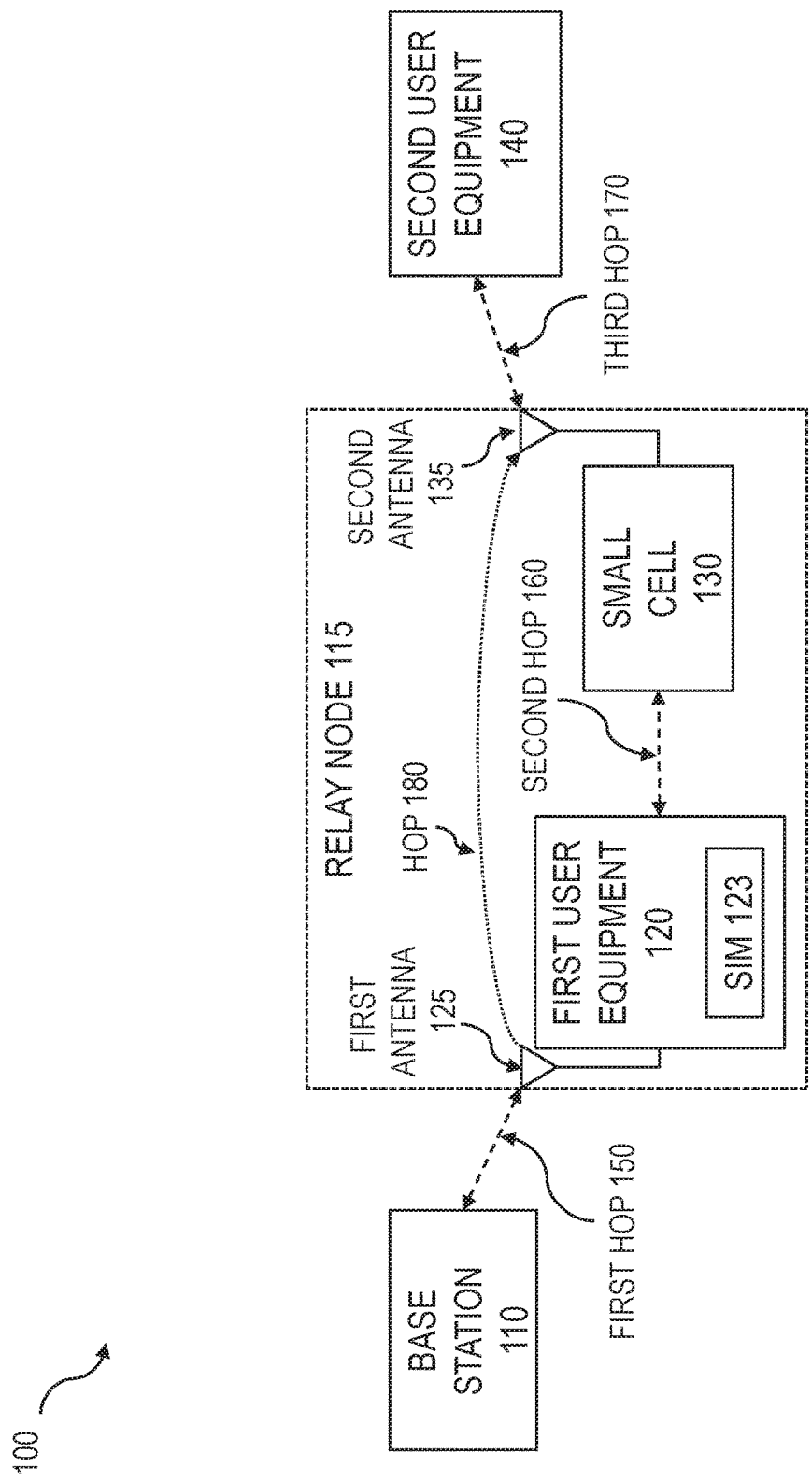
FIG. 1 shows a system block diagram illustrating aspects of a system showing features consistent with some implementations of cell barring.

This document describes systems and methods for cell barring in relay nodes. The systems and methods can provide a standards-compliant means to achieve the same feature of not camping on a specific small cell. For example, the standards-compliant means can include the compliance of a device (e.g., first user equipment, second user equipment, and/or the like) with, for example, telecommunications standards such as Long-Term Evolution (LTE), and/or the like. Standards compliance can be desirable because end-user throughput, performance, and overall user experience can be significantly improved over standards non-compliance. Additionally, standards compliance can ensure, among other things, that the compliant device provides increased data speeds with decreased latency, builds upon the security foundations of previous cellular systems, supports interoperability between current and next generation cellular systems and other data networks, improves system performance while maintaining current quality of service, and maintains interoperability with legacy systems.

Camping on a small cell can include, for example, establishing a wireless connection with the small cell. For example, the device camping on the small cell can include the device completing a cell selection and/or reselection process and choosing the small cell to provide available telecommunications services, such as calling, texting, internet connectivity, and/or the like. As described above, camping on a small cell can cause a non-functional loop. To overcome this problem, and maintain a standards-compliant relay system, the subscriber identity module (SIM) card (e.g., universal integrated circuit card and/or the like) incorporated in the user equipment (e.g., modem, first user equipment, and/or the like) can be designated with an access class designation indicating that the user equipment incorporating the SIM card is barred from camping on the small cell. Cell barring, or barring, can include restricting access of a device on certain cells based on, for example, the access class designation of the SIM card incorporated in the device (e.g., first user equipment, modem, and/or the like). The access class designation of a SIM card incorporated in a device can include an inclusion of the device into a category associated with a priority for accessing a network.

By designating a SIM card of, for example, a modem (e.g., first user equipment and/or the like) with an access class designation indicating that the modem incorporating the SIM card is prevented (e.g., barred) from camping on or reselecting to a small cell and configuring the small cell to communicate the modem's access class designation to devices wirelessly connected to the small cell, some implementations of the current subject matter can facilitate cell barring on the modem incorporating the SIM card while maintaining the standard-compliance of the modem. As such, the modem can dynamically assess the suitability of a cell to be camped on by checking the barring information of the small cell and its own (e.g., the modem, relay node, relay system, first user equipment, and/or the like) access class designation. And the modem does not need to maintain a list of identifiable information of small cells. Accordingly, some implementations of the current subject matter can save computational resources and can provide an improved relay system.

FIG. 1 is a system block diagram illustrating an example implementation of a system 100 configured to facilitate cell barring on a relay node 115. System 100 can include a base station 110, a relay node 115 (which can include first user equipment 120 and small cell 130), and a second user equipment 140 (e.g., phone, device, mobile device, mobile phone and/or the like). By designating a SIM card 123 incorporated in first user equipment 120 with an access class designation indicating that first user equipment 120 incorporating the SIM card 123 is barred from camping on or reselecting to small cell 130 and configuring small cell 130 to communicate the access class designation of SIM card 123 incorporated in first user equipment 120 to devices wirelessly connected to small cell 130, some implementations of the current subject matter can facilitate cell barring on first user equipment 120 while maintaining the standard-compliance of first user equipment 120.

Base station 110 can include a transceiver connecting a number of other devices to one another and/or to a wide area. For example, base station 110 can provide the connection between mobile phones and the wider telephone network. As another example, base station 110 can include a transceiver acting as a switch for computers in a network, connecting them to another local area network, the internet, and/or another network. As another example, base station 110 can act as a hub of a wireless network, a gateway between a wired network and a wireless network, a hub of a cellular network, and/or the like. In some cases, base station 110 can include an antenna and can be used in a mobile telecommunications network, for example, to maintain communication between the network and the mobile users through a radio link. The geographic area covered by for example, a base station, and more generally, a telecommunications transceiver, can be referred to as a cell.

Base station 110 can be in wireless communication with first user equipment 120. For example, system 100 can include a first hop 150 and a communications channel can be established on first hop 150 between base station 110 and first user equipment 120. First user equipment 120 can include SIM card 123 and antenna 125. First user equipment 120 can convert data into a format suitable for transmission, such as, by modulating a carrier wave signal to encode digital information for transmission and demodulating the carrier wave signal to decode the transmitted information. For example, first user equipment 120 can include a mobile broadband modem, such as an LTE modem, that can facilitate reception of Internet access via a mobile network. As described above, first user equipment 120 can communicate over a communications channel established on the first hop between base station 110 and first user equipment 120. The communications channel between base station 110 and first user equipment 120 can include a mobile broadband connection and can operate on a first frequency.

First user equipment 120 can include SIM card 123. SIM card 123 incorporated in user equipment 120 can include a universal integrated circuit card (UICC). The UICC can include, for example, a physical electronic authorization device and can include an embedded integrated circuit. The UICC can provide identification, authentication, data storage, application processing, and/or the like. For example, the UICC can include a subscriber identity module (SIM) application that can be used to identify and authenticate subscribers on mobile telephony devices, such as for providing access to cellular networks, and/or the like.

First user equipment 120 can be in communication with small cell 130. For example, system 100 can include second hop 160 and a communications channel can be established on second hop 160 between first user equipment 120 and small cell 130. The second hop 160 can be wired (e.g., ethernet) or wireless (e.g., using an unlicenced spectrum). Small cell 130 can include antenna 135. Small cell 130 can include cellular radio access nodes with a transmitting power less than a macrocell (e.g., base station and/or the like). In some cases, small cell 130 can include a transmitting range in the magnitude of 10 meters to a few kilometers. In some cases, small cell 130 can reuse frequencies in the spectrum of available frequencies, such as the licensed spectrum, the unlicensed spectrum, and/or the like.

In some cases, small cell 130 can include a femtocell, a picocell, a microcell, and/or the like. A femtocell can include a small, low-powered cellular base station and can be used in a home or small business. In some cases, a femtocell can extend service coverage in places with bad service coverage, such as indoors, the edge of a cell, and/or the like. A picocell can include a small cellular base station covering a small area, such as in-building (e.g., office, shopping mall, train station, and/or the like), in-vehicle (e.g., bus, airplane, and/or the like). A microcell can include a coverage area larger than a picocell, and can use power control to limit the radius of its coverage area. As described above, small cell 130 can be connected to a core network using a backhaul, such as provided by first user equipment 120 over the communications channel established on first hop 150 and the communications channel established on second hop 160.

First user equipment 120 coupled with small cell 130 can form relay node 115. Relay node 115 can provide backhaul connectivity to second user equipment 140. The backhaul portion of a network can include the intermediate links between the core network, or backbone network, and the small subnetworks at the edge of the network. In some cases, first user equipment 120 can provide backhaul to a wireless network for small cell 130 over the communications channel established on first hop 150 between base station 110 and first user equipment 120. Second user equipment 140 can include a device used directly by an end-user to communicate. For example, second user equipment 140 can include a hand-held telephone, a device equipped with a wireless transceiver, a laptop, a tablet, and/or the like. Small cell 130 can be in wireless communication with second user equipment 140. For example, system 100 can include third hop 170, and a communications channel can be established on third hop 170 between small cell 130 and second user equipment 140. The communications channel between small cell 130 and second user equipment 140 can operate on a third frequency.

As described above, in some cases, single frequency behavior can be desirable. For example, it can be desirable for the first frequency corresponding to the communications channel between base station 110 and first user equipment 120 and the third frequency corresponding to the communications channel between small cell 130 and second user equipment 140 to match. As discussed above, when the operating frequency of the communications channel on first hop 150 and the operating frequency of the communications channel on third hop 170 match, it can be desirable to prevent the creation of a non-functional loop between first user equipment 120 and small cell 130. For example, hop 180 can include a non-functional loop between first user equipment 120 and small cell 130. If first user equipment 120 is camped on small cell 130, then communications from second user equipment 140 can, for example, be transmitted from small cell 130 over second hop 160 to first user equipment 120 and from first user equipment 120 to small cell 130 over hop 180. As such, communications from second user equipment 140 may be stuck in the non-functional loop, and backhaul connectivity can be prevented. As will be described below, first user equipment 120 can be barred from camping on or reselecting to small cell 130.

Figure 2:
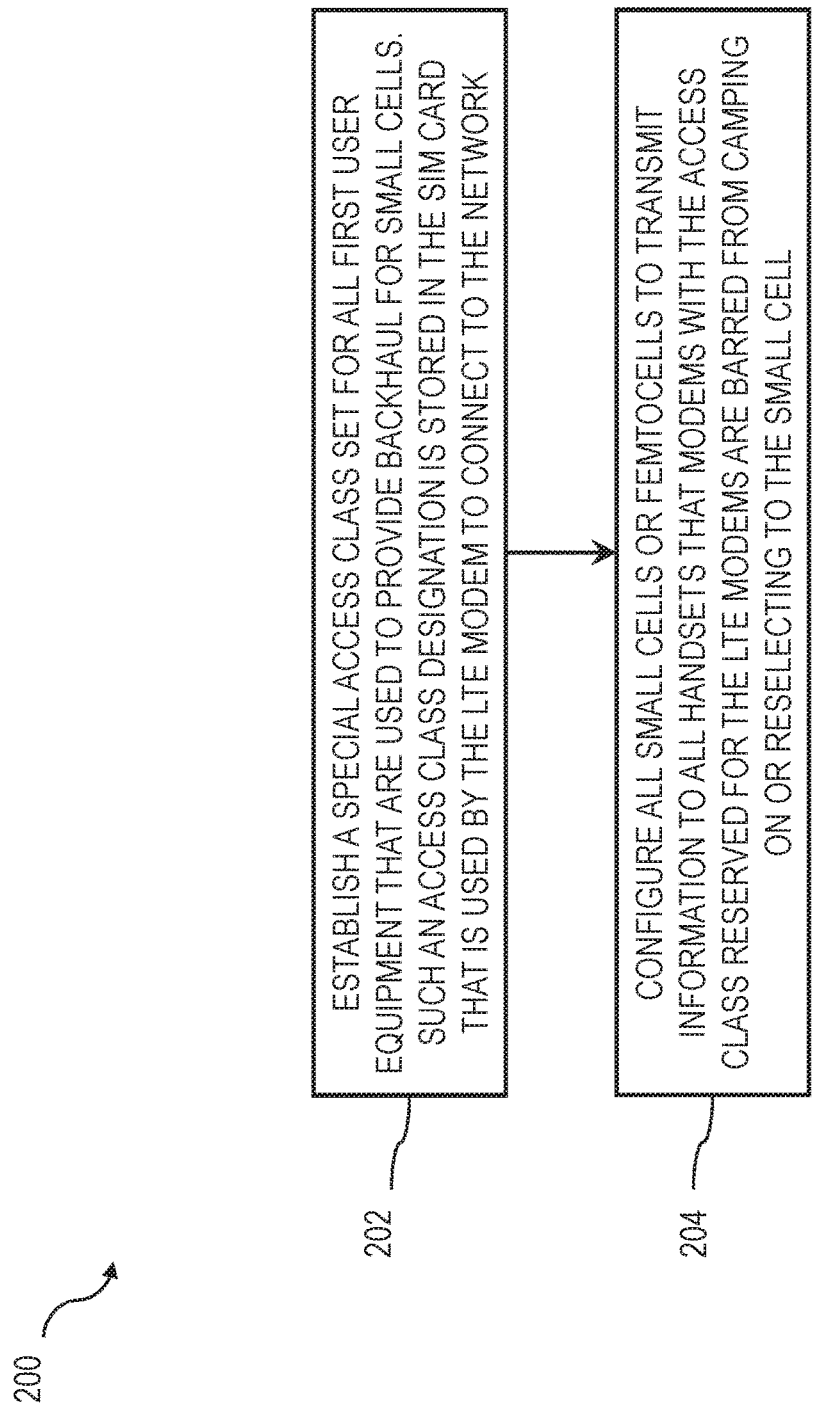
FIG. 2 shows a process flow diagram illustrating aspects of a method having one or more features consistent with some implementations of cell barring.

FIG. 2 is a process flow diagram illustrating an example implementation of a process 200 to facilitate cell barring in relay nodes of a small cell. By designating a SIM card 123 incorporated in first user equipment 120, such as an LTE modem, with an access class designation indicating that the first user equipment 120 incorporating SIM card 123 is barred from camping on or reselecting to a small cell 130 and configuring the small cell 130 to communicate the access class designation of SIM card 123 incorporated in first user equipment 120 to devices 140 wirelessly connected to the small cell 130, some implementations of the current subject matter can facilitate cell barring on the first user equipment 120 while maintaining the standard-compliance of the first user equipment 120.

At 202, an access class set can be established for all first user equipment 120 that are used to provide backhaul for small cells 130. Such an access class designation can be stored in SIM card 123 incorporated in first user equipment 120, such as the UICC, that can be used by the first user equipment 120 to connect to the network. At 204, all small cells 130 can be configured to transmit information to all handsets 140 that first user equipment 120 incorporating SIM card 123 with the access class reserved for the first user equipment 120 (e.g., LTE modems, and/or the like) are barred from camping on or reselecting to the small cell 130.

In some cases, it can be desirable to prevent devices from making access attempts to a network, for example, to prevent overload of the network. Preventing devices from making access attempts to the network (e.g., cell barring) can be facilitated by assigning an access class to each device. For example, the access class of a device can correspond to a priority of access of the device when attempting to establish a connection with the network. In some cases, such as in LTE, the access class of a device can include a designation between 0 and 15 (e.g., access class 0, access class 1, . . . , access class 15, and/or the like). For example, a device designated with access class 0, access class 1, . . . , access class 9 can be operated by an ordinary user. A device designated with access class 11 can be operated for network use, a device designated with access class 12 can be operated by security services, a device designated with access class 13 can be operated by public utilities, a device designated with access class 14 can be operated by emergency services, and a device designated with access class 15 can be operated by network staff. In case of a network overload, the network can reduce access from a device by modifying the radio resource configuration (RRC) information included in SystemInformationBlock-Type2 (SIB2). SIB2 can include access barring related parameters, such as the access class of the device. The access class of the device can be stored on a SIM card associated with the device, such as a UICC.

In some cases, the access class designation can be extended to include a designation that can prevent the device from accessing the network. For example, it can be desirable to prevent first user equipment 120 from establishing a non-functional loop over hop 180 with small cell 130. As such, the access class designation can be extended such that first user equipment 120 can be designated as a device that is prevented (e.g., barred) from connected to small cell 130, for example, over the first frequency. The access class designation of first user equipment 120 can include, for example, a cell status code referring to whether first user equipment 120 is prevented from establishing a connection with small cell 130 over hop 180. For example, the access class designation of a device, such as first user equipment 120, barred from camping on or reselecting to small cell 130 can include access class 16 and/or any unreserved access class designation specified for barring the device incorporating the SIM card storing the access class designation.

Figure 3:
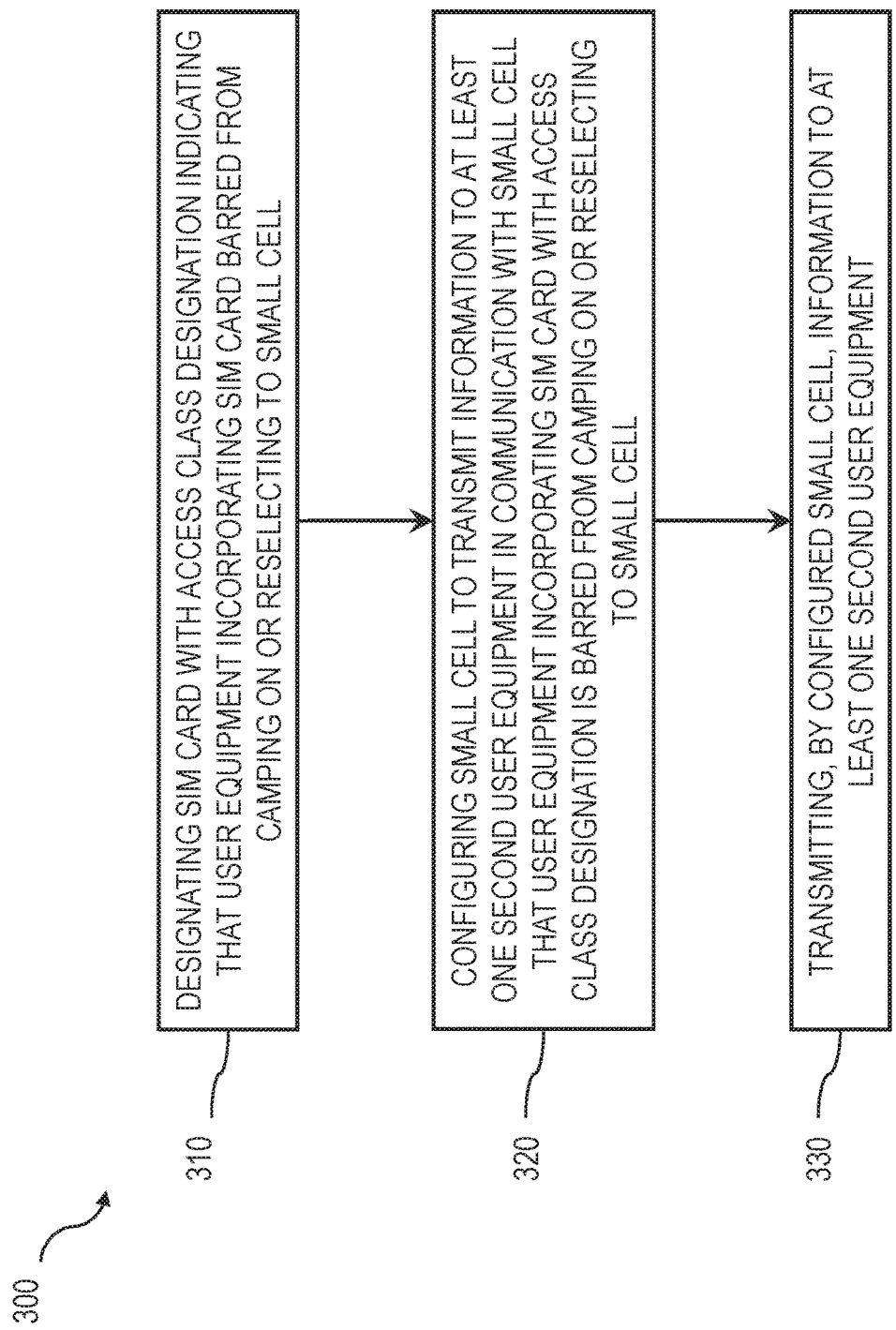
FIG. 3 shows a process flow diagram illustrating aspects of a method having one or more features consistent with some implementations of cell barring.

FIG. 3 is a process flow diagram illustrating an example implementation of a process 300 to facilitate cell barring in relay nodes of a small cell. By designating a SIM card incorporated in a first user equipment with an access class designation indicating that the first user equipment incorporating the SIM card is barred from camping on or reselecting to a small cell and configuring the small cell to communicate the access class designation of the SIM card incorporated in the first user equipment to devices wirelessly connected to the small cell, some implementations of the current subject matter can facilitate cell barring on the first user equipment while maintaining the standard-compliance of the first user equipment.

At 310, subscriber identity module (SIM) card 123 can be designated with an access class designation. The access class designation can indicate that first user equipment 120 incorporating SIM card 123 is barred from camping on or reselecting to small cell 130. In some cases, the frequency of the communications channel established on first hop 150 can be compared to the frequency of the communications channel established on third hop 170. For example, in response to the frequency used on first hop 150 matching the frequency used on third hop 170, first user equipment 120 can be barred from camping on or selecting to small cell 130. And for example, in response to determining that SIM card 120 incorporated in first user equipment 120 is barred from camping on or reselecting to small cell 130, small cell 130 can specify the access class designation indicative of cell barring.

For example, the access class designation indicative of cell barring can include a first value of a Boolean flag. In some cases, the Boolean flag can include the first value and a second value different from the first value. For example, the first value can be indicative that SIM card 123 incorporated in first user equipment 120 is barred from camping on or reselecting to small cell 120. As such, the access class designation of SIM card 123 incorporated in first user equipment 120 can include, for example, (Access class Barred=first value), where, as discussed above, a value of first value for the access class designation corresponding to cell barring can be indicative that first user equipment 120 incorporating SIM card 123 is barred from camping on or reselecting to small cell 120. In some cases, the Boolean flag can include the second value. For example, the second value can be indicative that first user equipment 120 is not barred from camping on or reselecting to small cell 120. As such, the access class designation of such a SIM card 123 can include, for example, (Access class Barred=second value), where, as discussed above, a value of second value for the access class designation corresponding to cell barring can be indicative that such a SIM card 123 is not barred from camping on or reselecting to small cell 130, for example, in the case that camping on or reselecting to small cell 130 may not cause a non-functional loop.

In some cases, the access class designation can include a single value indicative of cell barring, where if SIM card 123 incorporated in first user equipment 120 is associated with the single value indicative of cell barring, then first user equipment 120 incorporating SIM card 123 can be barred from camping on or reselecting to small cell 120 and if SIM card 123 incorporated in first user equipment 120 is not associated with the single value indicative of cell barring, then first user equipment 120 incorporating SIM card 123 cannot be barred from camping on or reselecting to small cell 120. In some cases, the access class designation can include more than two values.

The access class designation associated with SIM card 123 incorporated in first user equipment 120 can be stored in SIM card 123 incorporated in first user equipment 120. For example, SIM card 123 incorporated in first user equipment 120 can include a UICC. The access class designation can be persisted in the UICC, and the UICC can retain the persisted access class designation even after disconnecting power to first user equipment 120. In the Boolean flag example above, if first user equipment 120 incorporating SIM 123 is barred from camping on or reselecting to small cell 130, then the first value indicative of such cell barring can be stored in SIM card 123 incorporated in first user equipment 120. Continuing the Boolean flag example, if first user equipment 120 incorporating SIM card 123 is not barred from camping on or reselecting to small cell 130, then the second value indicative of not barring first user equipment 120 incorporating SIM card 123 from camping on or reselecting small cell 130 can be stored in SIM card 123 incorporated in first user equipment 120.

At 320, small cell 130 can be configured to transmit information to at least one second user equipment 140 in communication with small cell 130. The information can include the access class designation of SIM card 123 incorporated in first user equipment 120. In some cases, small cell 130 can establish a communications channel on third hop 170. The communications channel established on third hop 170 can operate wirelessly on a frequency matching the frequency of the communications channel established on first hop 150. When the frequency of third hop 170 matches the frequency of first hop 170, a message including the access class designation of SIM card 123 incorporated in first user equipment 120 can be prepared. Following the Boolean flag example, if first user equipment 120 incorporating SIM card 123 is barred from camping on or selecting to small cell 130, for example, due to the frequency of third hop 170 matching the frequency of first hop 150, then the prepared message can include the first value of the Boolean flag, where the first value is indicative of cell barring first user equipment 120 incorporating SIM card 123.

At 330, the information can be transmitted by small cell 130 to at least one second user equipment 140. As described above, the information can include an indication that that first user equipment 120 incorporating SIM card 123 is barred from camping on or reselecting to small cell 130. For example, the information can include the access class designation. First user equipment 120 incorporating SIM card 123 with the access class designation indicated in the information can be barred from camping on or reselecting to the small cell 130. In some cases, a signal can be sent by small cell 130 over a communications channel established on third hop 170 between small cell 130 and at least one second user equipment 140. The signal can include the message indicating the access class designation (e.g., a value corresponding to cell barring, where, if a SIM card 123 incorporated in first user equipment 120 includes such a value, then that first user equipment 120 is barred from camping on or reselecting to small cell 130 and/or the like). For example, the message can include the first value of the Boolean flag indicating that first user equipment 120 incorporating SIM card 123 is barred from camping on or reselecting to small cell 130.

Using this standards-compliant approach, the problem of the first user equipment, such as the LTE backhaul modem, camping on the small cell can be overcome without being standards non-compliant. Furthermore, it can allow the relay system, such as the first user equipment coupled to the small cell, to be able to dynamically assess if a cell is suitable to be camped on by checking the barring information of the small cell and its own access class information (e.g., by checking the access class information stored on the SIM card). In this way, no lists of identifiable information of small cells need to be kept by relay nodes.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   designating a subscriber identity module (SIM) card with an access class designation indicating that a first user equipment incorporating the SIM card is barred from camping on or reselecting to a small cell;
   wherein the first user equipment incorporating the SIM card with the access class designation is configured to provide backhaul to a wireless network for the small cell, wherein the first user equipment is barred from camping on or reselecting to the small cell;
   configuring the small cell to transmit information to at least one second user equipment in communication with the small cell that the first user equipment incorporating the SIM card with the access class designation is barred from camping on or reselecting to the small cell;
   transmitting, by the configured small cell, the information to the at least one second user equipment;
   persisting, in the SIM card, the access class designation;
   wherein the SIM card includes a universal integrated circuit card; and
   wherein the universal integrated circuit card retains the persisted access class designation after power to the first user equipment is disconnected.

2. The method of claim 1, wherein the designating further comprises:
   specifying, by the small cell and in response to determining that the first user equipment is barred from camping on or reselecting to the small cell, the access class designation with a first value of a Boolean flag, the first value indicating that the first user equipment is barred from camping on or reselecting to the small cell;
   wherein a backhaul to the wireless network for the small cell includes a first communications channel established on a first hop between the first user equipment and a base station; and
   wherein the backhaul to the wireless network for the small cell further includes a second communications channel established on a second hop between the first user equipment and the small cell, the second communications channel operating over a connection between the first user equipment and the small cell.

3. The method of claim 2, further comprising:
   comparing a first frequency of the first communications channel with a third frequency of a third communications channel, the third communications channel established on a third hop between the small cell and the at least one second user equipment; and
   barring, in response to the first frequency matching the third frequency, the first user equipment from camping on or reselecting to the small cell.

4. The method of claim 1, wherein the configuring further comprises:
   establishing, by the small cell, a third communications channel on a third hop between the small cell and the at least one second user equipment; and
   preparing a message including the access class designation indicating that the first user equipment is barred from camping on or reselecting to the small cell.

5. The method of claim 4, wherein the transmitting further comprises:
   transmitting, by the small cell and over the third communications channel, a signal including the message.

6. The method of claim 1, wherein the access class designation includes a cell status code indicating that the first user equipment is prevented from establishing a wireless connection with the small cell.

7. The method of claim 1, wherein barring camping on or reselecting to the small cell includes preventing the first user equipment from establishing the wireless connection with the small cell.

8. The method of claim 1, wherein the small cell includes a cellular radio access node with transmitting power less than a macrocell; and
   wherein the small cell further includes at least one of a femtocell, a picocell, and a microcell.

9. A method comprising:
   designating a subscriber identity module (SIM) card with an access class designation indicating that a first user equipment incorporating the SIM card is barred from camping on or reselecting to a small cell;
   configuring the small cell to transmit information to at least one second user equipment in communication with the small cell that the first user equipment incorporating the SIM card with the access class designation is barred from camping on or reselecting to the small cell;
   transmitting, by the configured small cell, the information to the at least one second user equipment;
   wherein the backhaul to the wireless network for the small cell includes a first communications channel established on a first hop between the first user equipment and a base station, the first communications channel operating wirelessly on a first frequency, wherein the backhaul to the wireless network for the small cell further includes a second communications channel established on a second hop between the first user equipment and the small cell, the second communications channel operating over a connection between the first user equipment and the small cell, wherein the SIM card includes a universal integrated circuit card, wherein the small cell includes a cellular radio access node with transmitting power less than a macrocell, wherein the small cell further includes at least one of a femtocell, a picocell, and a microcell, the method further comprising:

specifying, by the small cell and in response to determining that the first user equipment is barred from camping on or reselecting to the small cell, the access class designation with a first value of a Boolean flag, the first value indicating that the first user equipment is barred from camping on or reselecting to the small cell persisting, in the universal integrated circuit card, the access class designation;

establishing, by the small cell, a third communications channel on a third hop between the small cell and the at least one second user equipment, the third communications channel operating wirelessly on the first frequency;

preparing a message including the access class designation indicating that the first user equipment is barred from camping on or reselecting to the small cell; and transmitting, by the small cell and over the third communications channel, a signal including the message;

wherein the universal integrated circuit card retains the persisted access class designation after power to the first user equipment is disconnected.

10. A system comprising:
a first user equipment incorporating a subscriber identity module (SIM) card;
a small cell coupled to the first user equipment, wherein the first user equipment is configured to provide backhaul to a wireless network for the small cell, wherein the first user equipment is barred from camping on or reselecting to the small cell and wherein the small cell is configured to perform operations comprising:
  designating the SIM card with an access class designation indicating that the first user equipment incorporating the SIM card is barred from camping on or reselecting to the small cell;
  configuring the small cell to transmit information to at least one second user equipment in communication with the small cell that the first user equipment with the access class designation is barred from camping on or reselecting to the small cell;
  transmitting, by the configured small cell, the information to the at least one second user equipment;
  persisting, in the universal integrated circuit card, the access class designation; and
wherein the SIM card includes a universal integrated circuit card; and
wherein the universal integrated circuit card retains the persisted access class designation after power to the first user equipment is disconnected.

11. The system of claim 10, wherein the designating further comprises:
specifying, by the small cell and in response to determining that the first user equipment is barred from camping on or reselecting to the small cell, the access class designation with a first value of a Boolean flag, the first value indicating that the first user equipment is barred from camping on or reselecting to the small cell;
wherein a backhaul to the wireless network for the small cell includes a first communications channel established on a first hop between the first user equipment and a base station; and
wherein the backhaul to the wireless network for the small cell further includes a second communications channel established on a second hop between the first user equipment and the small cell, the second communications channel operating over a connection between the first user equipment and the small cell.

12. The system of claim 11, wherein the small cell is further configured to perform operations comprising:
comparing a first frequency of the first communications channel with a third frequency of a third communications channel, the third communications channel established on a third hop between the small cell and the at least one second user equipment; and
barring, in response to the first frequency matching the third frequency, the first user equipment from camping on or reselecting to the small cell.

13. The system of claim 10, wherein the configuring further comprises:
establishing, by the small cell, a third communications channel on a third hop between the small cell and the at least one second user equipment; and
preparing a message including the access class designation indicating that the first user equipment is barred from camping on or reselecting to the small cell.

14. The system of claim 13, wherein the transmitting further comprises:
transmitting, by the small cell and over the third communications channel, a signal including the message.

15. The system of claim 10, wherein the access class designation includes a cell status code indicating that the first user equipment is prevented from establishing a wireless connection with the small cell.

16. The system of claim 10, wherein barring camping on or reselecting to the small cell includes preventing the first user equipment from establishing the wireless connection with the small cell.

17. The system of claim 10, wherein the small cell includes a cellular radio access node with transmitting power less than a macrocell; and
wherein the small cell further includes at least one of a femtocell, a picocell, and a microcell.

18. A system comprising:
a first user equipment incorporating a subscriber identity module (SIM) card;
a small cell coupled to the first user equipment and configured to perform operations comprising:
  designating the SIM card with an access class designation indicating that the first user equipment incorporating the SIM card is barred from camping on or reselecting to the small cell;
  configuring the small cell to transmit information to at least one second user equipment in communication with the small cell that the first user equipment with the access class designation is barred from camping on or reselecting to the small cell; and
  transmitting, by the configured small cell, the information to the at least one second user equipment;
wherein the backhaul to the wireless network for the small cell includes a first communications channel established on a first hop between the first user equipment and a base station, the first communications channel operating wirelessly on a first frequency, wherein the backhaul to the wireless network for the small cell further includes a second communications channel established on a second hop between the first user equipment and the small cell, the second communications channel operating over a connection between the first user equipment and the small cell, wherein the SIM card includes a universal integrated circuit card, wherein the small cell includes a cellular radio access node with transmitting power less than a macrocell, wherein the small cell further includes at least one of a femtocell, a picocell, and microcell, and wherein the small cell is further configured to perform operations comprising:
specifying, by the small cell and in response to determining that the first user equipment is barred from camping on or reselecting to the small cell, the access class designation with a first value of a Boolean flag, the first value indicating that the first user equipment is barred from camping on or reselecting to the small cell;
persisting, in the universal integrated circuit card, the access class designation;
establishing, by the small cell, a third communications channel on a third hop between the small cell and the at least one second user equipment, the third communications channel operating wirelessly on the first frequency;
preparing a message including the access class designation indicating that the first user equipment is barred from camping on or reselecting to the small cell; and
transmitting, by the small cell and over the third communications channel, a signal including the message;
wherein the universal integrated circuit card retains the persisted access class designation after power to the first user equipment is disconnected.

* * * * *